United States Patent [19]

Savov et al.

[11] Patent Number: 4,462,878
[45] Date of Patent: Jul. 31, 1984

[54] METHOD OF TREATING AND REFINING LIQUID METAL ALLOYS BY DIRECT CURRENT ELECTRIC ARC HEATING

[75] Inventors: Peter H. Savov; Nikolay G. Bakalov; Alexander Y. Valchev; Boris Y. Drakaliiski; Vassil G. Peev; Stefan T. Bagarov; Yordan I. Krestenyakov; Russi T. Milenkov, all of Sofia; Malin R. Stoilov; Assen B. Ivanov, both of Pernik; Kolyo G. Karakolev, Sofia, all of Bulgaria

[73] Assignee: Iso "METALURGKOMPLEKT", Sofia, Bulgaria

[21] Appl. No.: 445,433

[22] Filed: Nov. 30, 1982

[30] Foreign Application Priority Data

Dec. 1, 1981 [BG] Bulgaria ................................. 54342

[51] Int. Cl.$^3$ .............................................. C25C 3/24
[52] U.S. Cl. ................................................... 204/140
[58] Field of Search ......................................... 204/140

[56] References Cited

U.S. PATENT DOCUMENTS 3,203,883  8/1965  Ototani ................................ 204/140

Primary Examiner—Thomas Tufariello

[57] ABSTRACT

Method of and apparatus for treating and refining liquid metal alloys by direct current arc heating. On at least a part of the melt surface there is performed an electrolysis whereby the melt across a layer of liquid slag-electrolyte is connected as an anode or a cathode, and the connection with the other pole—cathode or anode—is effected by means of one or more direct current arcs. Depending upon the desired direction of the electrolysis process, it is possible to change the polarity of the metal melt or the slag-electrolyte. The apparatus for performing the method comprises a vessel equipped with a mechanism for pouring, a movable cover and movable electrodes. The centers of the electrodes are disposed symmetrically one to the other in a vertical plane. As a source of direct current there are used two or more rectifiers operating independently.

6 Claims, 10 Drawing Figures

METHOD OF TREATING AND REFINING LIQUID METAL ALLOYS BY DIRECT CURRENT ELECTRIC ARC HEATING

This invention relates to an method of and an apparatus for treating and refining liquid metal alloys by direct current electric arc heating under a liquid refining slag-electrolyte, the invention being used in the production of special types of alloy steel and of in-depth refined alloys.

There are known method and apparatus for the out-of-furnace treatment and refining of liquid metal alloys, and in particular the treatment and refining of iron melts by heating the metal during the treating operation by an alternating current electric arc combined with a continuous stirring of the melt as by blowing it with an inert gas or by the use of an electromagnetic stirrer. Such methods and devices are shown, respectively, by Iron and Steel Making, Volume 4, 1977 (ASEA-SKF), and U.S. Pat. No. 3,501,289 (VAD-Finkl).

The essential disadvantage of the ASEA-SKF method is the necessity of performing the operations of heating and refining including the degassing of the melt in a predetermined sequence in different units of apparatus including containers of the heating and vacuum type. In the VAD-Finkl method, due to the carrying out of the electric arc heating under vacuum, it is possible to some extent to perform the different technological operations simultaneously but with increased operational costs because of the carrying out of the method under vacuum.

Both of the above-described prior art methods and apparatus employ devices known as ladle installations. In the ASEA-SKF apparatus the main shortcoming is the need of two separate enclosed containers; in the VAD-Finkl installation the chief disadvantage is the complicated cover construction of the container or containers which follows from the need for the vacuum sealing of the electrodes. In addition to the increased capital costs for the construction of both types of the above-described prior art apparatus, is the fact that, due to their use of an alternating current arc heating, it is impossible to use these devices with ladles having a capacity less than 15 tons.

A method of refining liquid alloys by using a direct current electric arc in the ladle is known (see Bulgarian Author's Certificate No. 25563). Such method, however, has not been used in the industry due to the difficulties encountered in the current supply (the water-cooled electrodes, and the electro-magnetic wind).

The present invention has among its objects the provision of a method of and an apparatus for treating and refining liquid metal alloys by direct current electric arc heating in the ladle. In accordance with the invention a symmetrical current supply through the slag-electrolyte makes it possible to insure the simultaneous proceeding of thermo-physical, physical-chemical and electro-chemical processes, thus attaining a refining in depth (including degassing and desulphurization). The invention provides a very efficient electric arc heating without any errosive action of the arc upon the lining of the ladle, a reduced consumption of electric power and electrodes, and a strict process control. In addition, the apparatus for carrying out the method according to the invention is of simplified construction, it does not require any use of vacuum, and hence it requires a reduced capital investment.

In the method in accordance with the invention an electrolysis occurs on at least a part of the melt surface, whereby the melt across a linear of liquid slag-electrolyte participates as an anode or a cathode, and the connection with the other pole (cathode or anode) is effected by means of one or more direct current electric arcs. Depending upon the desired direction of the process of the electrolysis, it is possible to change the polarity of the metal melt, or to perform an electric arc heating with three or more arcs, the circuit being closed by the slag-electrolyte.

The advantages of the method in accordance with the invention are the provision of conditions for the electro-chemical elimination of the harmful anionic impurities from the slag, and/or the metal, along with the performance of the metallurgical operations of alloying, heating;

homogenization and refining under a synthetic slag in the ladle;

avoiding the harmful action of the electro-magnetic wind on the refractory lining by a symmetrical current supply through the slag-electrolyte;

obtaining increased effectiveness and flexibility of heating;

providing for the control of the slag-electrolyte composition by the continuous measurement of the drop in voltage through the slag;

attaining reduced operational costs; and providing for the possibility for polarity change of the bath by a simple change of position of the electrodes.

The apparatus for carrying out the method includes a vessel-a ladle lined with refractory material and equipped with a device or mechanism for pouring of the melt without a stopper, a porous plug for blowing neutral gas through the bottom of the vessel or an induction stirrer, a movable cover lined with a refractory material and having bores for receiving the electrode, an aperture for adding the additives to the melt and for sampling the melt and the slag, an aperture for extraction of the exhaust gases, and movable consumable electrodes supplied by a source of direct current. The axes of the movable positive and negative electrodes are disposed symmetrically in a plane. As a source of direct current there are employed two or more rectifiers operating independently, whereby the closing of the circuit is effected by a common pole, which constitutes one of the poles (the plus sign or the minus sign) of the rectifiers.

The advantages of the apparatus according to the invention are:

a simpler construction;

reduction of the diameters of the graphite electrodes individually connected as anodes;

the noiselessness of the heating when using direct current; and the increased opportunity and possibility for automation and process control.

An essential feature according to the invention is that in contact with the metal melt there are brought substances which at the temperature of the bath under the conditions of electric arc heating form a layer of liquid slag-electrolyte; such layer is connected by means of at least two mobile consumable electrodes which are individually supplied by the positive poles of two or more sources of direct current such as rectifiers as an anode in such a manner that the melt also becomes an anode, while its connection with the cathode or cathodes is provided by one or more electric arcs. The cathodic arc contributes to the reduction of the hydrogen dissolved in the melt connected as anode; by introducing an appropriate amount of inert gas in the atmosphere over the surface of the bath or by the evacuation of such atmosphere it is possible to eliminate the hydrogen liberated in the arc. At the same time there is brought about an efficient heating of the metal, and a continuous stirring and bringing of the slag into contact with the metal melt through one or more direct current electric arcs disposed at the cathode or cathodes. Anionic impurities such as $S^{2-}O^{2-}$ which are released according to the laws of chemical equilibrium from the metal in the slag are discharged at the anodes and are liberated chiefly as volatile compounds $SO_2$, $CO$ by secondary electro-chemical reactions. There is also a possibility for changing the polarity of the metal melt by reswitching the sources of direct current, or by varying the position of the movable electrodes and operating them with anodic arcs for a predetermined time period.

The invention will be more readily understood upon consideration of the accompanying drawings, in which.

Figure 1:
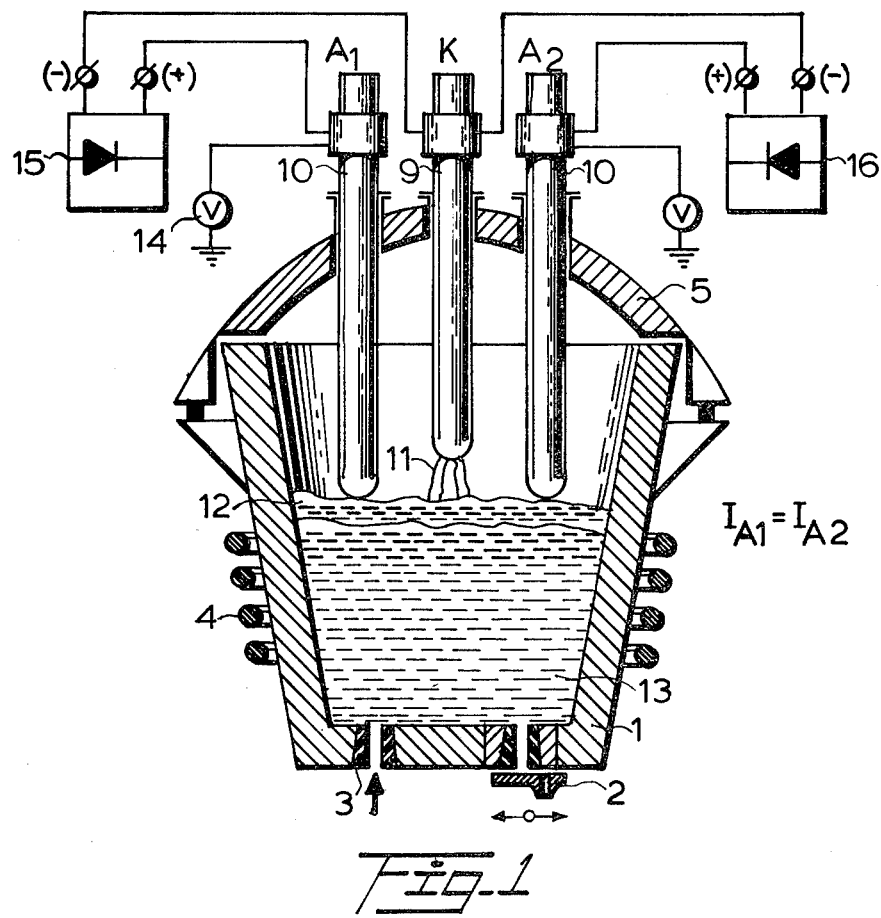
FIG. 1 is a view in cross-section through a first embodiment of the apparatus of the invention.
Figure 2:
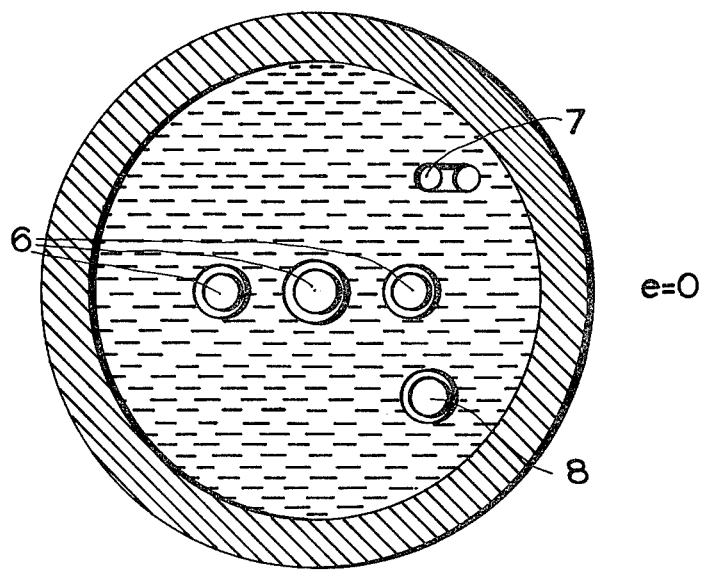
FIG. 2 is a view in horizontal cross-section through the apparatus of FIG. 1.

Turning first to the embodiment of FIGS. 1 and 2, the apparatus there shown has a vessel, a steel pouring ladle 1 lined with refractory material, a mechanism 2 for pouring without a stopper, a porous plug 3 for blowing in inert gas, a winding 4 which when supplied with electrical current functions as an induction stirrer, a cover 5 lined with refractories and having water-cooled apertures 6 for receiving electrodes which in this embodiment are disposed with their axes in a vertical plane, an opening (or openings) 7 for adding the alloy and slag-forming additives, an aperture 8 for eliminating exhaust gases, movable graphite electrodes including a cathode 9, and anodes 10. The apparatus includes sources 15 and 16 that are connected according to the arrangement there shown with electrodes 9 and 10, whereby an electric arc 11 burns at the cathode 9 and the anodes 10 are immersed in the slag 12 which covers the metal melt, such slag also acting as an anode. By the continuous measurement by recording volt meters 14 of the voltage drop through the slag at the anodes 10 the chemical composition and the properties of the slag-electrolyte 12 may be controlled.

Figure 3:
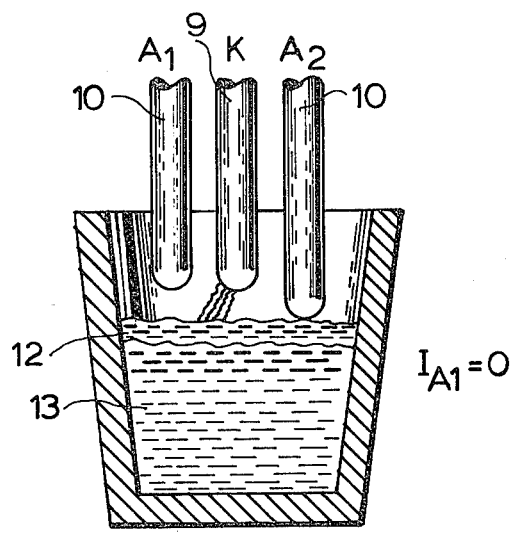
FIG. 3 is a schematic view of a first alternative arrangement of the anodes.
Figure 4:
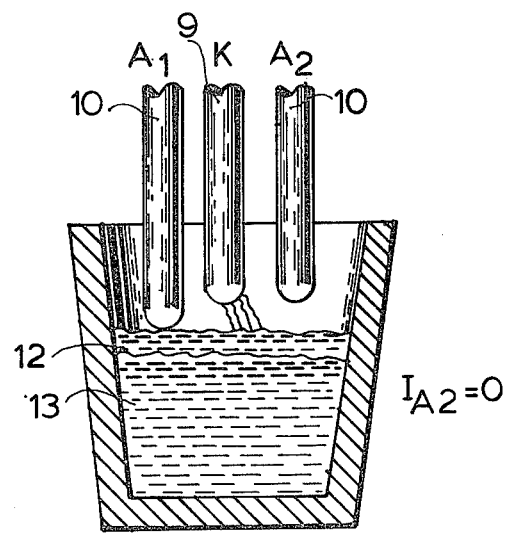
FIG. 4 is a schematic view of a second alternative arrangement of the anodes.

FIGS. 3 and 4 show schematically the arrangement of the anodes 10 ($A_1$ and $A_2$, respectively) with respect to the cathode 9 (K). By raising the anode $A_1$ over the slag 12 there is obtained a maximum deviation of the arc toward the left (FIG. 3) and by raising the anode $A_2$ above the slag there is obtained a maximum deviation of the arc toward the right (FIG. 4) and toward the periphery of the metal bath 13.

Figure 5:
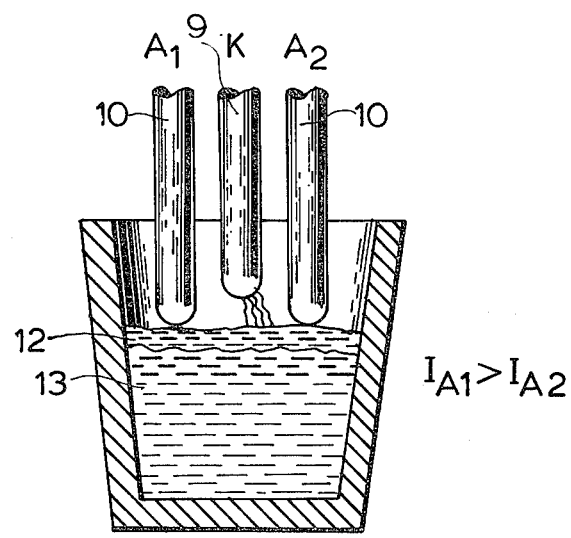
FIGS. 5 and 6 are schematic views showing two different deviations of the arc which are produced by altering the current loading of the anodes.
Figure 6:
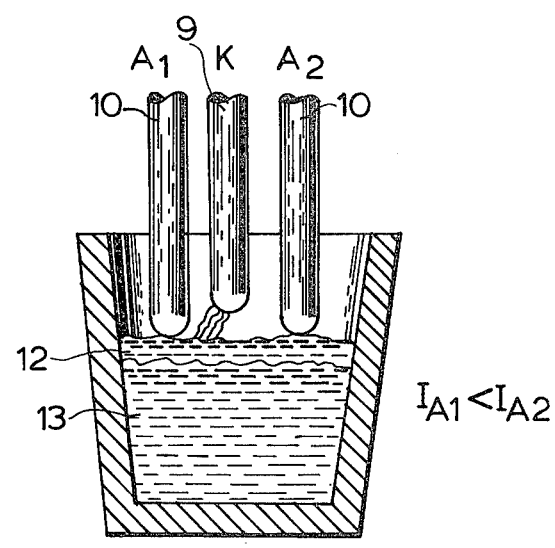

FIGS. 5 and 6 show how by altering the current loading of the anodes there is obtained a deviation of the arc to the right (FIG. 5) or to the left (FIG. 6). Thus, in FIG. 5 the current $I_{A1}$ supplied to anode $A_1$ is greater than the current $I_{A2}$ supplied to the anode $A_2$. In FIG. 6 the current $I_{A1}$ is less than the current $I_{A2}$.

Figure 7:
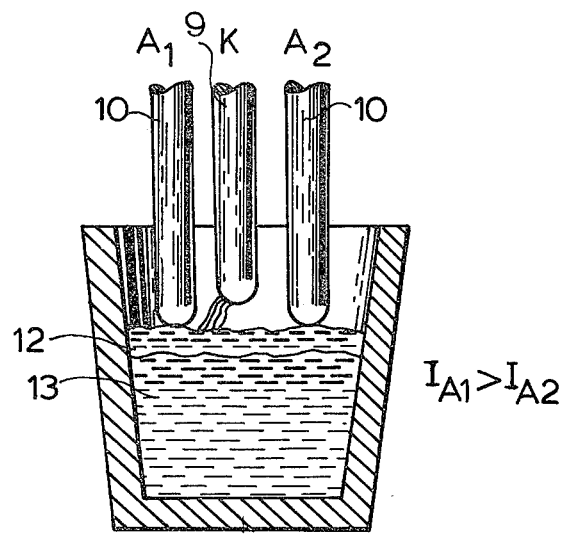
FIGS. 7 and 8 are schematic views showing a different eccentric linear alignment of the electrodes (anodes)
Figure 8:
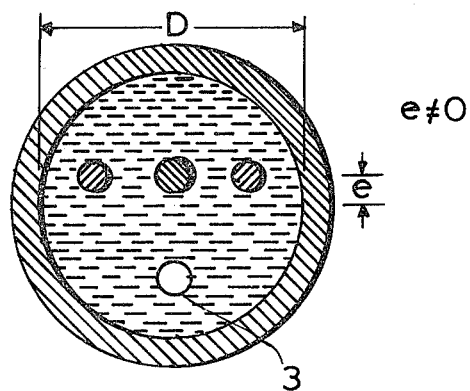

It is to be noted that in the arrangement of FIGS. 1 and 2 the plane in which the axes of the anodes and cathode lie extends through the central axis of the vessel or ladle, in other words the eccentricity (e) of such plane equals zero. In the arrangement shown in FIGS. 7 and 8, the plane containing the axes of the anodes and the cathode is displaced a distance e upwardly (FIG. 8) from the central axial plane, and the porous plug 3 is disposed diametrically opposite to the cathode 9 and spaced therefrom at a distance which is equal to substantially one half D, that is the diameter of the space within the vessel at a location near the top thereof. As a result of such arrangement, the slag-electrolyte 12 and the upper metal layers 13 are given a circular circulation and are intensively stirred by the blowing in of inert gas through the porous plug 3.

The apparatus thus far described operates as follows:

A predetermined amount of liquid metal 13 is poured from the furnace into the ladle 1 while avoiding the discharge of slag from the furnace into the ladle. The ladle is then transported under the movable cover 5. Through the aperture or apertures 7 there are added slag-forming agents (lime, Ca, $F_2$), then the feeding of inert gas for stirring the melt takes place via the plug 3 and the lowering of the electrodes, that is anodes 10, begins until their lower ends engage the slag layer 12; this is established by the measuring of the voltage drop at the anodes detected by the recording volt meters 14. Afterward the cathode 9 is lowered until an arc is struck at its lower end between it and the slag layer 12 in the center of the vessel 1. In this case, the metallic bath 13 is connected across the slag 12 as an anode.

Figure 9:
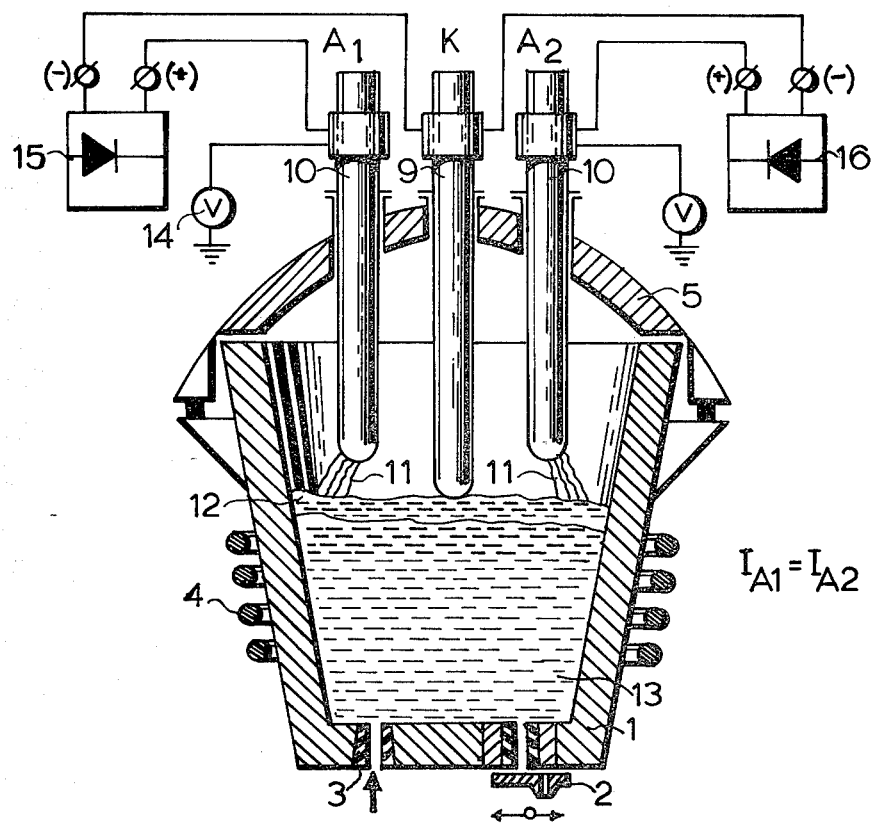
FIG. 9 is a view in vertical cross-section through the apparatus depicting an arrangement in which the polarity of the electrodes is different from that in the embodiment of FIG. 1.
Figure 10:
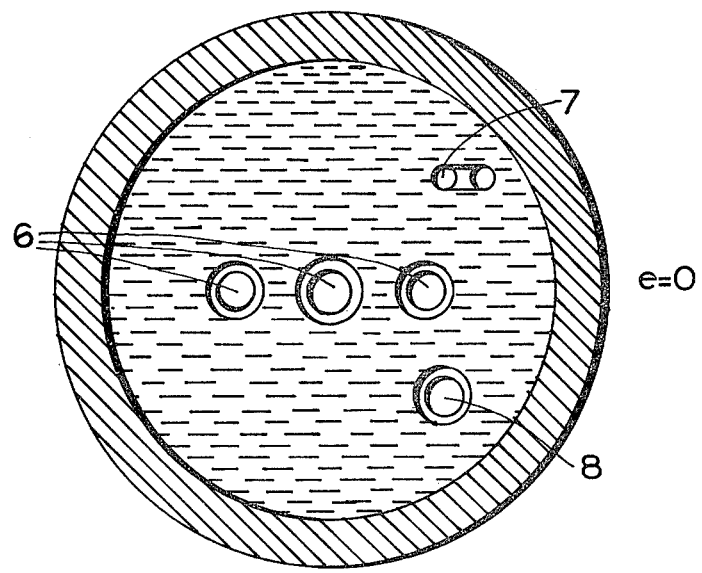
FIG. 10 is a view in horizontal cross-section through the apparatus shown in FIG. 9.

As noted above, the polarity of the electrodes may be selectively altered. In the arrangement of the electrodes shown in FIGS. 9 and 10, this is accomplished by raising the anodes 10 ($A_1$, $A_2$) over the bath and immersing the cathode 9 in the slag. In this case the metal bath is connected as a cathode while electric arcs are ignited at the anodes 10.

EXAMPLE

The method and apparatus according to the invention are illustrated by the following exemplary embodiments:

Into a six ton ladle with a height of the free space therewithin of 300 mm disposed on a movable cart there are poured, through the intermediary of a transport ladle while cutting off the furnace slag, 5.5 tons of liquid non-deoxidized steel produced in an electric furnace. At the time of such pouring the temperature of the metal was 1620 degrees C. and the chemical composition thereof was as follows (all of the following percentages being by weight):

| | |
|---|---|
| C | 0.18% |
| Mn | 0.23% |
| Si | 0.0417% |

|   |   |
|---|---|
| P | 0.024% |
| Cr | 0.12% |
| H | 7.73 parts per million |

After pouring the steel from the transport ladle into the operational ladle argon was fed into the melt for stirring thereof in amounts of 40–50 l/min., and the ladle was transferred by means of the cart under the movable cover. The cover was provided with two anodes each with a diameter of 150 mm, and one cathode having a diameter of 200 mm, as well as with apertures for sampling the melt and for introducing the additives. Under continuous stirring with argon through the bottom at the rate of 30 l/min. and blowing in under the cover 60 l/min. or argon a direct current arc heating with a cathodic arc was established.

The parameters of the heating were:
voltage—74 V
current—5000 A

During the arc heating there were fed Slag-forming agents as follows:

|   |   |
|---|---|
| lime | 15 kg/ton |
| fluorspar | 2 kg/ton |
| schamott | 1 kg/ton |

Deoxidizing and alloying agents as follows:

|   |   |
|---|---|
| FeMn | 6.1 kg/ton |
| FeNi | 5.6 kg/ton |
| FeCr | 7.8 kg/ton |
| FeMo | 3.1 kg/ton |
| Al | 0.9 kg/ton |

The duration of the treatment with direct current arc heating was 93 minutes. The temperature of the metal in the ladle prior to the treatment was 1545 degrees C. and after the treatment was 1590 degrees C. The rate of the temperature rise caused by the arc heating after reaching the thermic equilibrium in the ladle was 2.1 degrees C. per minute.

As a result of the treatment there is obtained a steel type 35 XM having the following chemical composition, all percentages being by weight:

|   |   |
|---|---|
| C | 0.33% |
| Mn | 0.74% |
| Si | 0.36% |
| P | 0.030% |
| S | 0.0053% |
| Cr | 0.92% |
| Mo | 0.17% |
| As | 0.030% |
| O | 25 parts per million |
| H | 5.0 parts per million |

The following performance was achieved:
desulphurization—87.3%
degassing—33.0%
assimilation of alloying agents and iron alloys—95%
consumption of electric power, AWh/ton—99
consumption of electrodes, kg/ton of metal—1.09.

Although the invention is illustrated and described with reference to a plurality of embodiments thereof, it is to be expressly understood that it is in no way limited to the disclosure of such preferred embodiments but is capable of numerous modifications within the scope of the appended claims.

We claim:

1. Method of treating and refining liquid metal alloys, comprising disposing such molten metal in a ladle, covering the molten metal in the ladle with a layer of liquid alloy refining slag-electrolyte, and heating the molten metal and liquid electrolyte by positioning a first consumable vertically movable electrode generally centrally of the ladle, positioning at least two second consumable vertically movable electrodes spaced at substantially equal distances on opposite sides of the first electrode in a plane located generally diametrically of the ladle, the lower end or end of one of the first and second electrodes being immersed in the liquid electrolyte and the lower end or ends of the first and second electrodes being spaced above the upper surface of liquid electrolyte, and energizing the electrodes by direct current to heat the liquid metal and the slag-electrolyte, the first electrode being of a first polarity and the second electrodes being of a second polarity, whereby to create an arc between the liquid electrolyte and the lower end of the electrode or electrodes spaced above the upper surface of the liquid electrolyte.

2. A method according to claim 1, wherein the first electrode is connected as a cathode, and the second electrodes are connected as anodes.

3. A method according to claim 1, wherein the first electrode is connected as an anode, and the second electrodes are connected as cathodes.

4. Method according to claim 1, wherein the metal alloy is steel.

5. Method according to claim 4, comprising adding alloying and slag-electrolyte forming materials during the heating of the liquid metal and the slag-electrolyte in the ladle.

6. Method according to claim 4, wherein the slag-electrolyte is composed of lime, fluorspar, and schamott.

* * * * *